L. P. HALLADAY.
BUMPER BRACKET.
APPLICATION FILED AUG. 2, 1920.
1,363,780. Patented Dec. 28, 1920.
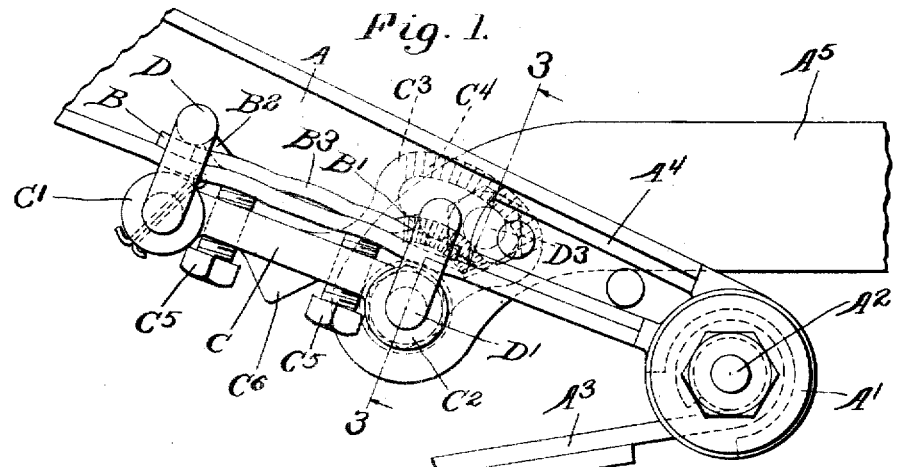
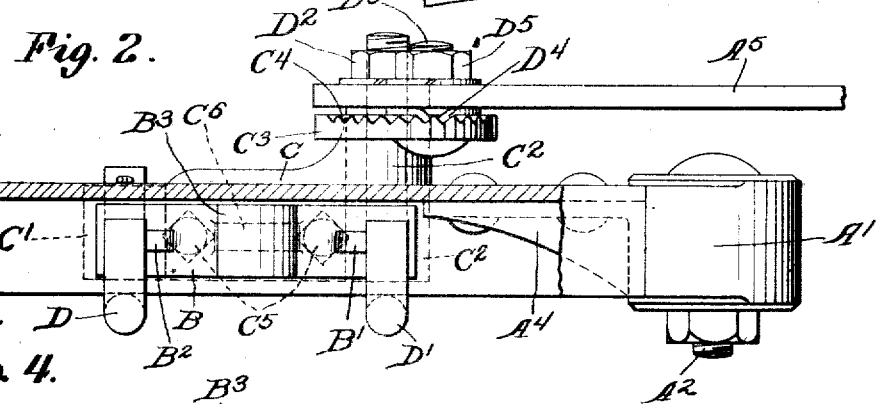
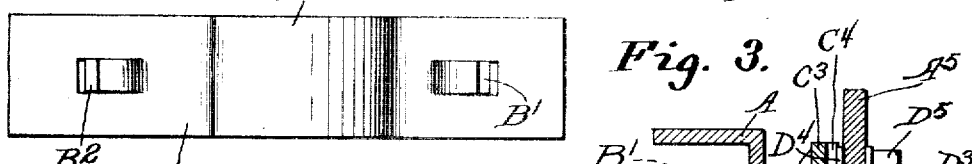
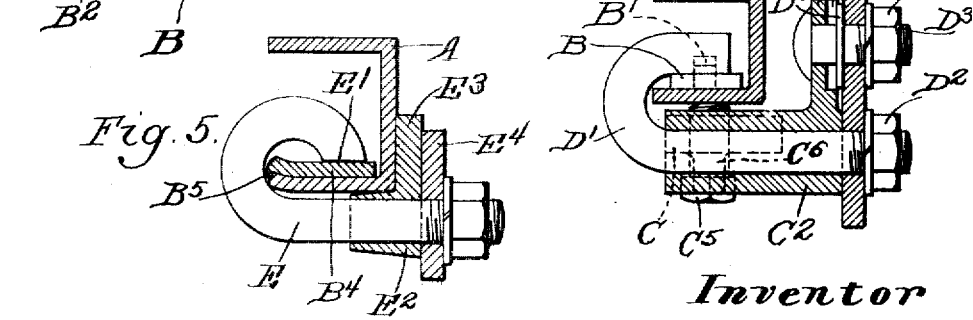
Witness
Edward T. Wray.
Inventor
Lewis P. Halladay
by Parker Carter
Attorneys

UNITED STATES PATENT OFFICE.

LEWIS P. HALLADAY, OF STREATOR, ILLINOIS.

BUMPER-BRACKET.

1,363,780.  Specification of Letters Patent.  Patented Dec. 28, 1920.

Application filed August 2, 1920. Serial No. 400,633.

*To all whom it may concern:*

Be it known that I, LEWIS P. HALLADAY, a citizen of the United States, residing at Streator, in the county of La Salle and State of Illinois, have invented a certain new and useful Improvement in Bumper-Brackets, of which the following is a specification.

My invention relates to improvements in bumper brackets for automobiles and has particular relation to that type of bumper bracket which is attached to one of the flanges of the automobile frame.

Experience has shown that when a bumper bracket is attached to the automobile frame flange at one or more points, there is a tendency to localize bending or distortion of the frame which finally results, owing to the vibration or weight of the bumper, in bending the frame enough to loosen the clamp. Sometimes this bending can be corrected by tightening up the clamp. In other cases the clamp may actually drop off.

This tendency could be eliminated by making the automobile frame thicker, but obviously, this is undesirable because the bumper and bumper clamp are made and applied by the distributer or the user and not by the manufacturer. The tendency might be eliminated by welding a strip of metal onto the frame at the point where the bumper clamp is to come, but this is undesirable on account of its expense, the damage to the frame, and the possibility of damaging the frame through inexpert work and on account of the fact that it is sometimes desirable to change the type or position of the bumper bracket, and if the frame were permanently reinforced at one point, it might develop that this reinforcement would not be at the right place.

My invention, therefore, comprises an arrangement by which a reinforcing member may be associated with the frame and with the bumper clamp for the purpose of reinforcing the clamp where the bending is liable to take place. The reinforcement may be a continuous one so that there is one reinforcing member for the entire bumper bracket or it might be made up of a plurality of parts so that there is one reinforcing part for each hook or member which holds the clamp on the frame. The reinforcement which I propose to use may be associated with the bumper bracket or clamp disclosed in my Patents Nos. 1,344,797, 1,344,798, and 1,344,799 or in the patent to Lyon No. 1,266,836 or in connection with other well known bumper clamps all of which are prone to the difficulty above referred to.

When this reinforcing member is applied as a unit in connection with those types of bumper brackets which rely on a slight local bending of the frame flange to assist in positioning the bumper bracket, it is obviously desirable that the reinforcement do not prevent this bending, but partake of this bending to a degree sufficient to hold the parts in place but not sufficient to release the clamp.

One object of my invention, therefore, is to provide a reinforcing means in connection with a bumper bracket support or clamp which will leave the frame flange free to bend sufficiently to position the clamp, but will not permit any further bending such as will result in loosening of the clamp.

Another object is to provide reinforcing means which will prevent localized bending of the frame to a degree sufficient to loosen the clamp. Another object is to reinforce the edge of the flange where tension or compression is brought upon it for the purpose of preventing loosening of the bumper bracket support. Another object is to assist in positioning those holding members which hold the clamp or bracket on the frame. Other objects will appear from time to time in the specification.

My invention is illustrated more or less diagrammatically in the accompanying drawings wherein:

Figure 1 is a side elevation of the front end of the automobile frame showing my device in place;

Fig. 2 is a plan view with parts in section.

Fig. 3 is a section along the line 3—3 of Fig. 1;

Fig. 4 is a plan view of the reinforcing plate;

Fig. 5 is a section similar to Fig. 3 but showing my device applied in connection with the Lyon type of hook bolt.

Like parts are indicated by like characters throughout the drawings.

A is the forward horn of the usual type of automobile frame terminating at its front end in a spring eye A' in which is a spring bolt $A^2$ carrying the normal automobile spring $A^3$. As shown, the spring eye is mounted on a part $A^4$ which is seated into and preferably welded in place in the forward end of the frame in accordance with the usual automobile frame construction practice. $A^5$ is one of the forwardly extending arms adapted to hold and support the ordinary type of bumper which may be rigid, or spring, or spring mounted, the particular details of which have nothing to do with my present invention.

B is a reinforcing plate. It is provided at either end with integral upwardly bent and outwardly extending tongues $B'$ $B^2$ formed by punching them out of the body of the plate. The plate is centrally arched as indicated at $B^3$. It is adapted to rest upon the upper surface of the lower flange of the frame being free to be adjusted thereupon at the best judgment of the operator. $B^4$ is a modified form of the reinforcing plate shown in Fig. 5. In this case, the reinforcing member $B^4$ has a lip or flange $B^5$ overhanging the outer edge of the frame flange adapted to prevent inward lateral movement of the reinforcing plate. This modified form of plate does not have the spaced lugs $B'$ $B^2$ shown in Fig. 4 of the plate B because in this arrangement, I preferably use a separate reinforcing plate for each separate holding hook or bolt.

C is the clamp body adapted to underlie the automobile frame. It terminates at either end in integral sleeve $C'$ $C^2$ and adjacent the sleeve $C^2$ is provided with upwardly extending slot lug $C^3$ corrugated as indicated on its upper surface as at $C^4$, this lug being rotated on an extension of the sleeve $C^2$ where it projects out from beneath the automobile frame. $C^5$ $C^5$ are set screws, screw-threaded in the clamp body and adapted to engage the under side of the frame flange. These screws are as close to the sleeve $C'$ $C^2$ as is conveniently possible and the body of the clamp is provided with a reinforcing integral flange member $C^6$ between the two set screws.

D is a U shaped hook member rotatable in the sleeve $C'$, the outer arm of the U being adapted as shown to penetrate the channel of the frame and rest upon the reinforcing plate B and engage the lug $B^2$. $D'$ is a U shaped hook bolt rotatable within the sleeve $C^2$, the shorter arm of which is adapted to penetrate within the channel, rest upon the plate B, and engage the lug $B'$. This hook bolt $D'$ has a screw-threaded end upon which is pivoted the arm $A^5$ which is held in place against the lug $C^3$ by the tightening of the nut $D^2$ on the bolt. $D^3$ is a locking and adjusting bolt passing through the lug $C^3$ and curved slot therein as shown. $D^4$ is a lock washer having upwardly curved ends to engage the corrugations $C^4$ on the lugs $C^3$, the bar $A^5$ and lug $C^3$ being adapted to be drawn together with the corrugation engaged by the washer when the nut $D^5$ is tightened up.

In the modified form shown in Fig. 5, E is a hook bolt of the Lyon type having a curved hook thereon arranged so that the extremity of the curved hook is flattened as at $E'$ to engage the surface of the reinforcing plate $B^4$ while the curved portion of the hook when it is tightened in the direction of the arrow engages the reinforced frame flange where it is reinforced by the plate $B^4$. $E^2$ is a sleeve or holder in which the hook bolt is slidably mounted. It has a flange $E^3$ adapted when the hook bolt is tightened up on the bumper bar support $E^4$ to engage the outer vertical wall of the frame to hold the parts in position.

I claim:

1. A clamp adapted to secure a bumper to a flange of an automobile frame in combination with a flange reinforcement adapted to be held in position on the flange by the clamp.

2. A two part clamp adapted to secure a bumper to a flange of an automobile frame in combination with a flange reinforcement adapted to be held at its ends by the two portions of the clamp.

3. A clamp adapted to secure a bumper to a flange of an automobile frame in combination with a flange reinforcement adapted to be held in position on the flange by the clamp, said reinforcement comprising a plate between the flange and the clamp.

4. A two part clamp adapted to secure a bumper to a flange of an automobile frame in combination with a flange reinforcement adapted to be held at its end by the two portions of the clamp, said reinforcement comprising a plate between the flange and the clamp.

5. A clamp adapted to secure a bumper to a flange of an automobile frame in combination with a flange reinforcement adapted to be held in position on the flange by the clamp, said reinforcement comprising a plate between the flange and the clamp, said plate upwardly bent at its middle.

6. A two part clamp adapted to secure a bumper to a flange of an automobile frame in combination with a flange reinforcement adapted to be held at its end by the two portions of the clamp, said reinforcement comprising a plate between the flange and the clamp, said plate upwardly bent at its middle.

7. A two part clamp adapted to secure a bumper to a flange of an automobile frame in combination with a flange reinforcement adapted to be held at its ends by the two portions of the clamp, and an engagement device between the reinforcement of the clamp, which prevents its longitudinal motion.

8. A clamp comprising two clamping members and an intermediate connection, the whole adapted to secure a bumper to a flange of an automobile frame, in combination with a flange reinforcement adapted to be held in position on the flange by the clamp.

9. A clamp comprising two clamping members and an intermediate connection, the whole adapted to secure a bumper to the flange of an automobile frame, in combination with a flange reinforcement adapted to be held in position on the flange by the clamp, the ends of reinforcement underlying the clamp member.

10. A clamp comprising two clamping members and an intermediate connection, the whole adapted to secure a bumper to the flange of an automobile frame, in combination with a flange reinforcement adapted to be held in position on the flange by the clamp, members upwardly projecting between the clamping members.

11. A clamp comprising two clamping members and an intermediate connection, the whole adapted to secure a bumper to the flange of an automobile frame in combination with a flange reinforcement adapted to be held in position on the flange by the clamp, which comprises a plate provided with projections which engage the clamp members and prevent a longitudinal motion of the plate.

12. A clamp comprising two clamping members and an intermediate connection the whole adapted to secure a bumper to the flange of an automobile frame in combination with a flange reinforcement adapted to be held in position on the flange by the clamp underlying it at its ends, the reinforcement provided with projections which engage the clamping members to prevent longitudinal motion of the plate.

13. A clamp comprising two clamping members and an intermediate connection the whole adapted to secure a bumper to the flange of an automobile frame in combination with a flange reinforcement adapted to be held in position on the flange by the clamp, which comprises a plate upwardly extending between the two clamping members and provided with projections which engage the clamping members and prevent longitudinal motion of the plate.

14. A clamp adapted to secure a bumper to a flange of an automobile frame in combination with a flange reinforcement adapted to be held in position on the flange by the clamp, and to hold the clamp in position on the reinforcement.

15. A clamp comprising a plurality of clamping members and an intermediate connection, the whole adapted to secure a bumper to the flange of an automobile frame, in combination with a flange reinforcement adapted to be held in position on the flange by the clamp means on said reinforcement for preventing displacement of the clamping members in relation thereto.

16. A clamp comprising a plurality of clamping members and an intermediate connection, the whole adapted to secure a bumper to the flange of an automobile frame, in combination with a flange reinforcement adapted to be held in position on the flange by the clamp, means on said reinforcement for preventing displacement of the clamping members in relation thereto, comprising members upwardly projecting from said reinforcement.

17. A clamp comprising a plurality of clamping members and an intermediate connection, the whole adapted to secure a bumper to the flange of an automobile frame, in combination with a flange reinforcement adapted to be held in position on the flange by the clamp, means on said reinforcement for preventing displacement of the clamping members in relation thereto, comprising upwardly projecting tongues integral with the reinforcement.

Signed at Chicago county of Cook and State of Illinois, this 20th day of July 1920.

LEWIS P. HALLADAY.